Dec. 9, 1947. H. RUTISHAUSER 2,432,213
VALVE
Filed Oct. 11, 1944 2 Sheets-Sheet 1
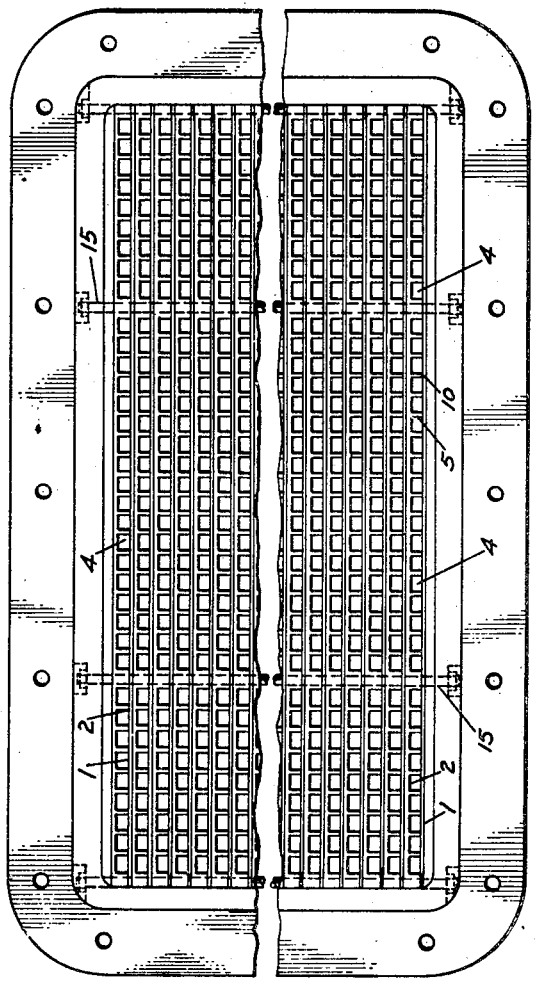
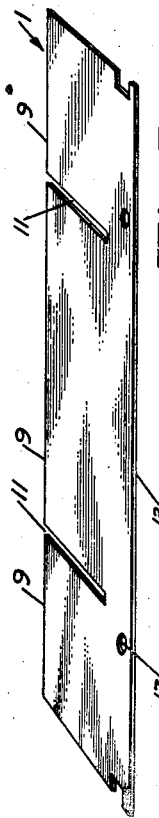
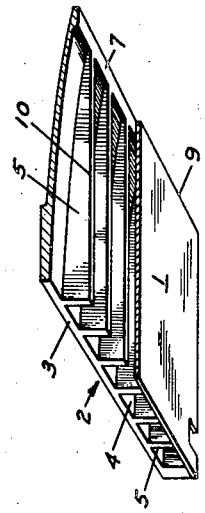
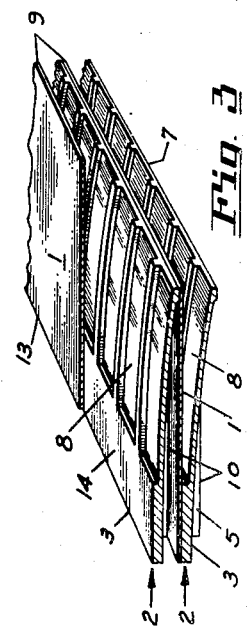
INVENTOR.
HANS RUTISHAUSER
BY
ATTORNEYS Dec. 9, 1947. H. RUTISHAUSER 2,432,213
VALVE
Filed Oct. 11, 1944 2 Sheets-Sheet 2

INVENTOR.
HANS RUTISHAUSER
BY
ATTORNEYS

Patented Dec. 9, 1947

2,432,213

UNITED STATES PATENT OFFICE 2,432,213

VALVE

Hans Rutishauser, Altadena, Calif., assignor to Aerojet Engineering Corporation, Azusa, Calif., a corporation of Delaware Application October 11, 1944, Serial No. 558,145

2 Claims. (Cl. 277—60)

1

This invention relates to valves and more particularly to automatic valves capable of controlling two or more fluid streams flowing at different pressures.

The invention provides a valve means capable of rapidly and automatically responding to slight differential pressures on opposite sides of the valve.

In my co-pending application, Serial No. 550,-695, filed August 23, 1944, which matured into Patent No. 2,417,270 on March 11, 1947, I have disclosed a valve means suitable for operation in a flow conduit which required a single valve to control the entire flow through the conduit.

In accordance with a feature of my present invention my valve is adapted to be placed in the cross sectional plane across two or more fluid flow conduits, one within the other, in which the pressure differential between the front and the rear of the valve in the different sections may be the same in both, greater in one, or negative in one and positive in the other. The valve according to my invention is useful in controlling the flow of several streams of fluid in two or more channels where these are within the outer channel, and is particularly useful in some types of jet propulsion motors such as is described in the co-pending application of Fritz Zwicky, Serial No. 558,219, filed simultaneously with this application.

These features of my invention will be more fully understood from the following detailed description and accompanying drawings in which:

Fig. 1 is a partial front view with center portion broken away showing the square conduit form of the valve;

Fig. 2 is a perspective view of a valve blade which operates two channels simultaneously;

Fig. 3 is a partial perspective view, partly in cross section, showing the valve blade interleaved between two valve members;

Fig. 4 is a partial detailed perspective view looking up from the underneath side of the valve body;

The valve is built up of an assembly of flexible blades 1 and a rigid channel member 2 as illustrated in Figs. 1, 3, 4, 5 and 7 respectively. Each rigid channel member 2 comprises a rectangular

Figure 6:
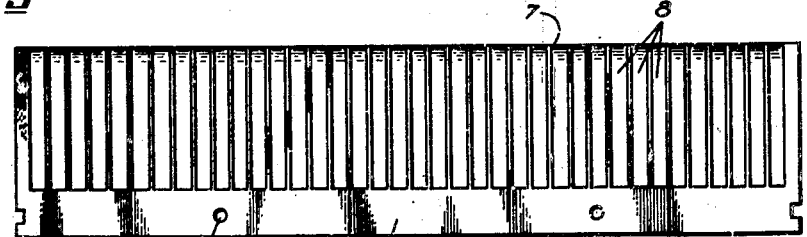
Fig. 6 is a plan view of one of the valve members.
Figure 7:
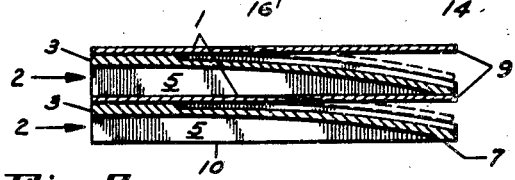
Fig. 7 is a sectional end view of a pair of valve members and blades.

2 plate 3, the upper face of which is provided with a curvature as shown in Fig. 7. The lower surface of plate 3 is provided with a number of channels 4 formed by channel partitions 5 which are integral with plate 3 and run parallel with each other as shown. These channel partitions 5 taper in depth being deeper at the leading edge and tapering toward the rear edge 7 to coincide with the thickness of the rear edge of the plate. The upper surface of member 2 is provided with a series of parallel grooves 8 corresponding to the number of channels and positioned so that each groove ends approximately near the center between two channel members. Each blade 1 is rectangular as shown in Fig. 2 in correspondence with the shape of the channel member as shown in Fig. 6.

Fig. 3 is a perspective view illustrating a flexible blade 1 sandwiched between two adjacent members 2. The appearance of the channel member 2 is brought out more clearly by the illustration in Fig. 4, which shows the appearance of the member from below.

The curvature of the face 3 of each channel member is such that the rear edge 7 of each channel member comes down to meet the rear edge 9 of the corresponding adjacent valve blade 1 as more clearly shown in Fig. 2. The arrangement is such that the lower edge 10 of all channel partitions 5 of each channel member is flat against the flat surface of blade member 1 as illustrated in Figs. 3, 4 and 7.

By this assembly arrangement the rear edges of flexible blade 1 are able to vibrate so as to alternately contact and move away from the rear edge 7 of member 2. This creates the valve action, the valve being closed when blade edge 9 is against valve member edge 7. The grooves 8 keep the blade from sticking in the open position.

Figure 5:
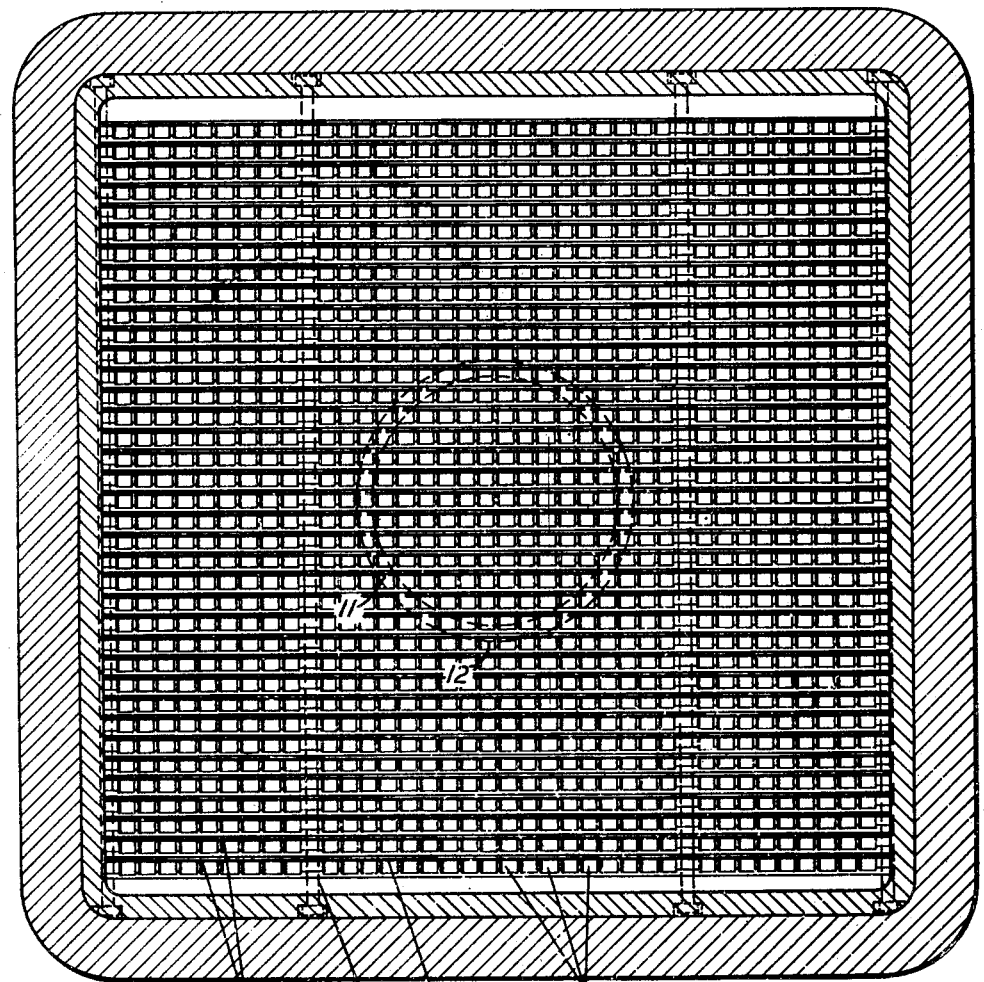
Fig. 5 is a rear view of the valve partly in cross section shown in Fig. 1 illustrating these segmental blades and their relation to the inlet duct.

When the valve assembly is to be adapted for simultaneously regulating the flow through two or more channels one within the other in which the pressure differential may be positive on the discharge side of the valve in one, and negative on the discharge side of the valve in the other, it is necessary to provide slotted valve blades as shown in Figs. 2 and 5. Slots 11 are cut at the proper point in the blade and the combination of a series of these permits that portion of the blade which controls flow through one channel 12, shown by the dotted circular area in Fig. 5, to operate separately and independently from that portion of the same blade which is operating flow through the outer channel. When the valve assembly is complete several flexible solid and slotted blades 1 are alternately interleaved between several channel members 2 and they are firmly held near their leading edge 13 between channel strips 5 and the front flat face 14 of the next. These are still further bound together by long bolts 15 which pass through holes 16 and 17 in the valve member and blades respectively. This assembly arrangement is shown more clearly in Figs. 1 and 5 which show the alternate channel member 2 and flexible blades 1 stacked in the conduit space which the valve must control.

While the secondary inner conduit 12 as shown in this invention is circular in shape, this type of valve could be adapted to any other shaped conduit as well, by merely adjusting the position of the slots in the blades to conform with the particular form desired.

In accordance with my invention I have provided a sensitive valve arrangement which is well adapted for insertion in a series of fluid flow conduits which are within each other and particularly where this channel or channels are located centrally with respect to the outer channel.

When the pressure on the fluid of the discharge side of the valve in my conduit is greater or equal to the pressure acting on the fluid in the entrance, the valve bank in that conduit will remain closed thereby preventing a reverse flow of fluid. As soon as the pressure on the discharge side is less than that acting on the entry side of the valve in the particular conduit the flexible blades will be depressed and permit the fluid to pass through the valve assembly at that section.

The degree of flexibility required is dependent on the particular operation. The flexibility may be varied by selecting the proper thickness and material of which the blade is to be made. It is evident that the valve assembly of my invention may be designed for either high or low pressure differentials and provide an effective automatic valve means capable of operating one or more ducts or channels through one valve assembly which does not require any complicated moving parts and which may be easily repaired and assembled.

I claim:

1. An automatically operable valve adapted to control separately the flow of fluids through a plurality of conduits disposed within one another, comprising a plurality of rigid plates provided with channel members forming channels in the direction of fluid flow and a plurality of flexible blades interleaved between the rigid plates, said blades lying substantially in the plane of fluid flow and being rigidly held at their forward edges against the respective channel members, and adapted to rest against the rear edges of the channel member to close the valve and to be flexibly moved away from the rear edges by fluid pressure on the blades to open the valve, the wall of the inner conduit being brought up against the forward edge of the channel members and a number of adjacent ones of said blades being provided with slots projecting thereinto from the rear edges toward the front edges to a point adjacent the rigidly held portions thereof, said slots extending substantially parallel to the direction of fluid flow, the slots being so positioned that a line passing through all of the slots describes a closed area in the configuration of and coinciding with the inner conduit.

2. In combination with a pair of fluid flow conduits one of which is circular in section and located within the other, an automatically operable valve adapted to control separately the flow of fluids through both of said conduits, said valve comprising a plurality of rigid plates provided with channel members forming channels in the direction of fluid flow and a plurality of flexible blades interleaved between the rigid plates, said blades lying substantially in the plane of fluid flow and being rigidly held at their forward edges against the respective channel members, and adapted to rest against the rear edges of the channel members to close the valve and to be flexibly moved away from the rear edges by fluid pressure on the blades to open the valve, the circular end wall of the inner conduit being brought up against the forward edge of the channel members, and a number of said blades lying adjacent each other being provided with parallel slots projecting a substantial distance thereinto from the rear edges toward the front edges to a point adjacent the rigidly held portions thereof, said slots extending substantially parallel to the direction of fluid flow, the slots being so positioned that a line passing through the slots will describe a circle coinciding with the circular wall of the inner conduit.

HANS RUTISHAUSER.

REFERENCES CITED

The following references are of record in the file of this patent:

UNITED STATES PATENTS

| Number | Name | Date |
| --- | --- | --- |
| 861,566 | Wiki | July 30, 1907 |
| 1,299,761 | Nelson | Apr. 8, 1916 |
| 2,064,754 | Ivens | Dec. 15, 1936 |
| 2,211,212 | Langdon | Aug. 13, 1940 |
| 2,302,447 | King | Nov. 17, 1942 |

FOREIGN PATENTS

| Number | Country | Date |
| --- | --- | --- |
| 512,632 | Great Britain | Sept. 21, 1939 |